Patented Feb. 8, 1938

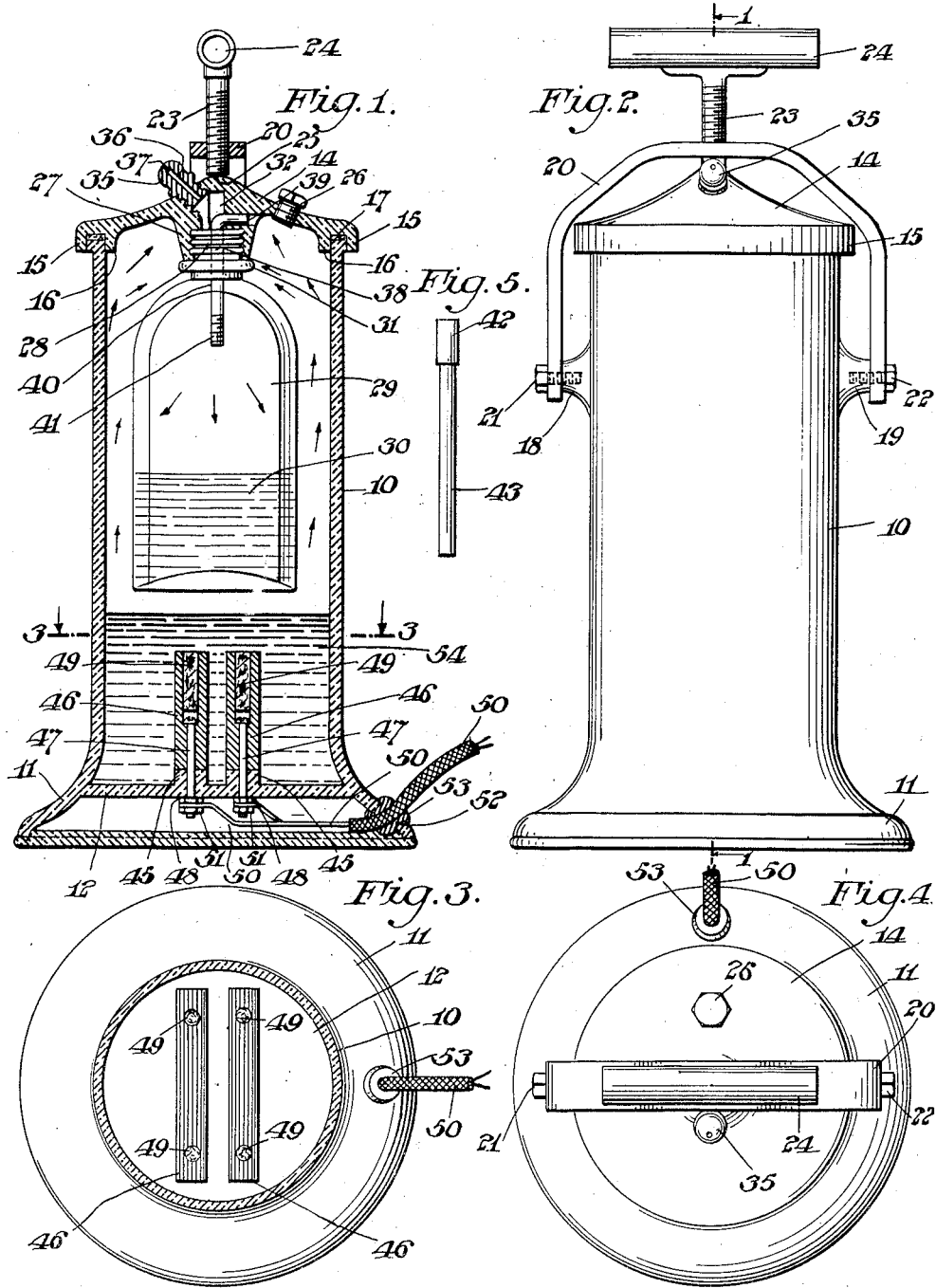

2,108,020

UNITED STATES PATENT OFFICE 2,108,020

DISPENSER

Harry R. Noll, Philadelphia, Pa., assignor of one-half to John W. Coyle, Philadelphia, Pa.

Application March 16, 1936, Serial No. 69,169

5 Claims. (Cl. 219—40)

The invention relates to dispensers and more particularly to a device for dispersing medicinal or insecticidal vapors throughout a room or other chamber.

It is an object of the invention to provide a dispenser which is sturdy in construction without complication of the parts thereof, and which may be readily moved from place to place as desired.

It is a further object of the invention to provide a vaporizer which will automatically cease operation after a predetermined time interval has elapsed.

It is a further object of the invention to provide a vaporizer which is particularly suitable for producing and disseminating vapors for the treatment of colds, hay fever, asthma and the like.

It is a further object of the invention to provide a dispenser which will be suitable for dispersing as desired a medicinal vapor, an insecticide or a fumigant throughout a room.

Other object of the invention will appear from the specification and claims.

The nature and characteristic features of the invention will be more readily understood from the following description taken in connection with the accompanying drawing forming part hereof in which Figure 1 is a vertical central sectional view taken approximately on the line 1—1 of Fig. 2, illustrating, on a reducing scale, a preferred embodiment of the present invention;

Fig. 2 is an external view of the dispenser, shown in elevation;

Fig. 3 is a horizontal sectional view taken approximately on the line 3—3 of Fig. 1;

Fig. 4 is a top plan view of the dispenser; and

Fig. 5 is an elevational view of an extension tube and coupling which may be used with the device.

It will, of course, be understood that the description and drawing herein contained are illustrative merely, and that various changes and modifications may be made in the structure disclosed without departing from the spirit of the invention.

Referring more particularly to the drawing, in the form of the device there shown, an outer casing member 10 is provided, the same being of hollow cylindrical form and preferably made of bakelite or other suitable synthetic plastic material. The casing member 10 may, of course, be of metal. The casing member 10 is provided with an enlarged base or supporting portion 11. The lower end of the cylindrical casing is preferably closed by means of a bottom portion 12 which is spaced upwardly from the bottom rim of the base portion 11. The upper end of the cylindrical casing 10 is closed by a top cover member 14 which is clamped in position in any preferred manner.

The top cover member 14 is provided with spaced, downwardly extending flanges 15 and 16 which position the cover member 14 on the upper edge of the cylindrical casing member 10 and a washer 17 may be interposed between the cover member 14 and the upper edge of the casing member 10 for rendering the joint therebetween fluid tight.

Bosses 18 and 19 are formed on the exterior of the cylindrical casing member 10 and a bail 20 preferably of inverted U-shape, has the end portions thereof mounted by means of bolts 21 and 22 to swing to the position shown in Figs. 2 and 4, for clamping the top cover member 14 in place, or to a position to clear the top of the casing 10 and permit the removal of the top cover member 14.

A bolt member 23 is threaded in the bail 20 and the upper end of the bolt 23 has secured thereto a horizontally extending handle 24. The lower end of the bolt member 23 is adapted to contact a depression 25 in the top cover member 14 to hold the cover member 14 in position with respect to the cylindrical casing 10. The handle 24 serves for turning the bolt 23 to clamp the top cover member 14 in position and also serves as a handle for lifting the entire device and moving it to the desired location in the room where the same is to be used.

A safety plug 26 may be provided in the top cover member 14 which will, upon excessive pressures being attained within the interior space of the casing member 10, blow out, thereby permitting the excessive pressure to be released and preventing rupture of the casing member 10 or the top cover member 14.

The top cover member 14 has a downwardly extending portion 27 with an internal bore 28 therein.

A fluid container 29 is provided within the casing 10 and preferably comprises a bottle having a threaded neck portion 31 for fluid-tight engagement with a complementally threaded portion in the bore 28.

As hereinafter more fully referred to, the fluid container 29 receives the fluid as at 30 to be vaporized and this fluid may be a medicinal material, the vapors of which have curative properties, may be an insecticidal material, the vapors of which react suitably upon the insects desired to be exterminated, or may be of a fumigant material whose vapors are germ destroying.

The downwardly extending portion 27 of the top cover member 14 also has a smaller bore 32, in communication with the bore 28 and therethrough with the interior of the fluid container 29.

A nozzle 35 is threaded or otherwise secured to the top cover member 14, has a central passageway 36 therethrough, and has a nozzle orifice 37. The nozzle orifice 37 and the passageway 36 are in communication with the bore 32 and thus with the interior of the fluid container 29.

The cover member 14 also has mounted therein a tube 38, preferably of metal. The tube 38 has one portion 39 thereof extending through the portion 27 and in communication with the interior space of the casing 10 outside the fluid container 29, and has another portion 40 extending downwardly within the fluid container 29 in communication with the interior of the fluid container 29. The lower end of the portion 40 of the tube 38 is threaded as at 41 for the attachment of an internally threaded coupling 42 and an extension tube 43, as shown in Fig. 5, for purposes hereinafter referred to.

The bottom portion 12 of the casing 10 preferably has interior lugs 45 extending upwardly within the interior space of the casing 10. Electrodes 46, preferably of carbon, are provided at the bottom of the interior space of the casing 10 and each electrode 46 is mounted on the lug 45 by means of bolt members 47 which extend through the electrode 46, the lug 45 and the bottom portion 12. The lower ends of the bolts 47 are preferably provided with nuts 48 which hold the electrode 46 in position within the casing 10. Cork inserts 49 may be provided in the electrodes 46 above the heads of the bolts 47 to prevent leakage of fluid from the interior space of the casing member 10.

Electrical conductors or wires 50 may be connected to the lower ends of the bolts 47 and held in position by nuts 51. The wires 50 pass through an aperture 52 in the enlarged flange 11 of the base portion of the casing 10 and may be suitably protected against wear and short circuiting by a washer 53. These wires 50 are adapted to be connected to a suitable source of electrical power such as a wall plug or electric light socket (not shown).

The operation of the device will now be pointed out.

The top cover member 14 is removed from the casing 10. The fluid container 29 is then detached from the top cover member 14 and partially filled with a fluid, as at 30, having the desired characteristics upon vaporization, as referred to above. The fluid container 29 is then again attached to the top cover member 14.

If medicinal vapors are desired, it has been found advisable that the portion 40 of the tube 38 terminate above the level of the fluid 30, although if an insecticidal fluid is placed in the fluid container, it has been found preferable to have the tube 38 extend below the surface of the fluid 30 to a point a short distance from the bottom of the fluid container 29.

A measured quantity of water is then poured into the casing 10, as at 54, and surrounds the electrodes 46. The quantity of water thus introduced is dependent upon the length of time it is desired to have the vaporizer operate. This water may extend above the bottom of the fluid container 29 without interfering with the satisfactory operation of the device.

The top cover member 14 is then placed in position on the upper edge of the casing member 10.

The bail 20 is swung to the position shown in Figs. 2 and 4, and the bolt member 23 turned by the handle 24 to bring the end portion thereof into firm contact with the depressed portion 25 of the top cover member 14. The handle 24 is then turned until the top cover member 14 is held firmly in place.

The wires 50 may now be connected to the source of electric energy. The water at 54 surrounding the electrodes 46 completes an electrical circuit therebetween and the water is heated. The heating of the water heats the fluid 30 in the fluid container 29. Within a very short time after the electric energy has been applied to the electrodes 46, the water at 54 boils, and the steam given off passes upwardly filling the space within the casing 10 outside the fluid container 29. The steam then passes into the pipe 38 through the portion 39, and then through the portion 40 of the pipe 38 is introduced into the fluid container 29.

With the pipe 38 as shown in Fig. 1 terminating above the level of the liquid in the fluid container, the steam upon entering impinges upon the surface of the liquid 30 and agitates the liquid. The evaporant vapors given off from this liquid mix with the steam, and this gaseous fluid passes through the interior of the neck portion 31 of the container 29, the bore 28, the bore 32, the nozzle passageway 36 and the nozzle orifice 37 from which the gaseous fluid is discharged into the room.

It has been found in practice that the vapor coming out of the orifice 37 is not sufficiently high in temperature to burn anyone coming in contact with this vapor. At the same time, the fluid in the fluid container 29 is quickly atomized and distributed from the device in such a manner that the vapor is disseminated to all parts of the room.

Where the tube 38 extends below the surface of the liquid in the fluid container 29, the liquid is violently agitated by the passage upwardly therethrough of the steam. The mixture of evaporated and entrained fluid passes, as pointed out above, to the nozzle 36 from which it is discharged.

The fluid adjacent the electrodes 46 continues to boil until practically all of this fluid is vaporized; whereupon the circuit through the electrodes 46 is broken and the operation of the device is automatically terminated until the casing 10 has again been supplied with a suitable quantity of water. The quantity of water introduced into the casing 10 in each instance determines the length of time the dispenser will operate.

I claim:

1. In a vapor dispensing device, a hollow casing adapted to receive a fluid, means carried by said casing and mounted in the lower portion thereof for heating said fluid, said means including members adapted to be electrically connected by said fluid, a cover member for said casing, a liquid container for vaporizable liquid secured to said cover member within said casing, a nozzle mounted on said cover member, and structure providing a passageway within said cover member between the interior of the casing and the interior of the liquid container and another passageway within said cover member between the interior of the liquid container and the nozzle.

2. In a vapor dispensing device, a hollow casing adapted to receive a fluid and having heating electrodes mounted in the bottom thereof, said electrodes being adapted to be electrically connected by said fluid, a cover member for said casing, a liquid container for vaporizable liquid detachably secured to said cover member within said casing, a nozzle mounted on said cover member, and structure providing in said cover member a passageway between the interior of the casing and the interior of the liquid container and another passageway between the interior of the liquid container and the nozzle.

3. In a vapor dispensing device, a hollow casing adapted to receive a fluid and having electrodes for heating said fluid mounted in the bottom thereof, a cover member for said casing, a liquid container for vaporizable liquid within said casing, means for detachably securing said cover member to said container, a nozzle secured to said cover member, structure in said cover member providing a passageway between the interior of the casing and the interior of the liquid container for the passage of gaseous fluid, a tube for directing said gaseous fluid downwardly with respect to the surface of the vaporizable liquid, and structure in said cover member providing another passageway between the interior of the liquid container and the nozzle for the passage of the gaseous fluid and the vapor from the vaporizable liquid.

4. In a vapor dispensing device, a hollow casing member adapted to receive a liquid, means for heating said liquid, a cover member for said casing member, means for securing said cover member to the top of said casing, a fluid container secured to said cover member within said casing, a nozzle mounted on said cover member, and passageways in said cover member for the flow of gaseous fluid from the interior of the casing member to the interior of said fluid container and from the interior of said fluid container to the nozzle, said passageways including a vertically disposed tube centrally located with respect to the interior of the fluid container for directing the gaseous fluid downwardly and into impinging contact with substantially the entire surface of the fluid in the fluid container.

5. In a vapor dispensing device, a hollow casing member adapted to receive a liquid, means within the casing for heating said liquid, said means including spaced electrodes mounted in the bottom of the casing member and adapted to be electrically connected by said liquid, a cover member for said casing member secured to the top thereof, a fluid container within said casing removably secured to said cover member, a nozzle mounted on said cover member, passageways in said cover member for the flow of gaseous fluid generated by the heating means from the interior of the casing member to the interior of said fluid container and passageways in said cover member for the flow of gaseous fluid from the interior of said fluid container to the nozzle.

HARRY R. NOLL.